United States Patent [19]
Loris

[11] Patent Number: 5,642,435
[45] Date of Patent: Jun. 24, 1997

[54] STRUCTURED DOCUMENT PROCESSING WITH LEXICAL CLASSES AS CONTEXT

[75] Inventor: Keith Loris, Concord, Mass.

[73] Assignee: Xerox Corporation, Stamford, Conn.

[21] Appl. No.: 378,151

[22] Filed: Jan. 25, 1995

[51] Int. Cl.⁶ .................. G06K 9/72; G06K 9/62
[52] U.S. Cl. ........................... 382/229; 382/224
[58] Field of Search .................. 382/229, 224, 382/225, 309, 310, 226, 227, 228

[56] References Cited

U.S. PATENT DOCUMENTS

| | | | |
|---|---|---|---|
| 4,654,875 | 3/1987 | Srihari et al. | 382/40 |
| 4,750,122 | 6/1988 | Kaji et al. | 364/419 |
| 4,754,489 | 6/1988 | Bokser | 382/225 |
| 4,876,731 | 10/1989 | Loris et al. | 382/40 |
| 4,949,392 | 8/1990 | Barski et al. | 382/61 |
| 4,979,227 | 12/1990 | Mittelbach et al. | 382/310 |
| 5,052,043 | 9/1991 | Gaborski | 382/14 |
| 5,119,437 | 6/1992 | Kuwamura et al. | 382/224 |
| 5,159,667 | 10/1992 | Borrey et al. | 395/148 |
| 5,251,294 | 10/1993 | Abelow | 395/155 |
| 5,276,741 | 1/1994 | Aragon | 382/310 |

*Primary Examiner*—Leo Boudreau
*Assistant Examiner*—Bhavesh Mehta
*Attorney, Agent, or Firm*—Mark Costello; Duane C. Basch

[57] ABSTRACT

Patterns of intelligence detected in a digital image representation are correlated with pattern classes according to a predetermined set of rules for improved pattern identification. Identified patterns are subsequently mapped to classes for continued use of classification.

4 Claims, 7 Drawing Sheets

STRUCTURED DOCUMENT PROCESSING WITH LEXICAL CLASSES AS CONTEXT

The present invention relates to pattern recognition in structured document processing, and more particularly, to pattern recognition in structured document processing using lexical classification as context information for recognition processing.

CROSS REFERENCE

Cross reference is made to U.S. patent application Ser. No. 07/814,552 (also published as WO 941957, Sep. 1, 1994) entitled "Software Product for Categorizing Strings in Character Recognition" by Kaplan, Shuchatowitz and Mullins (hereinafter, Kaplan et al.), filed Dec. 30, 1991, and assigned to the same assignee as the present application.

BACKGROUND OF THE INVENTION

In pattern recognition techniques, including optical character recognition (OCR), digital images are processed to recognize features that may convey information about the image. In the example of a character recognition system, a digital image is processed to identify characters or character-like information. Shapes are classified and mapped to known characters. A significant problem in such systems is that it is desirable to provide detection for a pattern that may have significant variations from occurrence to occurrence, while at the same time, providing high confidence detection. For example, with reference to FIG. 1, many occurrences of the characters labeled A and B or C and D are virtually impossible to distinguish. Thus, detection is ambiguous, since either of the possibilities may be correct. The font or print quality may enhance or detract further from the possibility of correctly identifying the character represented in the image.

It is well known that providing "context" or external information for a pattern identification process aids in increasing the confidence of correct detection, or decreases ambiguity. For example in an OCR process, checking a recognized string of characters against a dictionary of words, may serve to increase the confidence of correct detections of each character. Additionally, if the dictionary check shows close similarity to a word with the exception of one or two characters difference, the OCR process may return the word corrected in accordance with the dictionary check. Additional examples of context include commonly noted letter combinations, word spelling, word parts of speech and comparison to known a priori information. Note for example, U.S. Pat. No. 4,876,731 to Loris et al.

Forms processing uses spatial position of detected information as context. See, for example, U.S. Pat. No. 4,949,392 to Barski et al. For the purposes of this discussion, a structured document will be defined as a commonly-used hard copy document that requests entry of symbols, typically alphanumerics, but not limited thereto, at specific spatial locations on the hard copy document. Particular examples include tax forms, job application forms, insurance forms, etc. Also included, however, are other highly structured documents such as business letters, memos, facsimiles, specialized reports, scientific papers and legal papers, etc. which by custom or specification follow defined formats. To derive information from these structured documents, a hard copy sheet(s) is scanned by a digital input scanner to derive a digital image representing the hard copy document. In one standard form processing arrangement, a form template identifies data entry fields by location (commonly a set of x-y coordinates) on the page. The template may further define the contextual clues that may be used to check and constrain the OCR results. For example, it may be known that the required entry into a data entry field at position x,y on the sheet is a United States Social Security Number. Only numeral characters can appear in such an entry, and the format for such an entry should be 3 digits-2 digits-4 digits. Referring back to the example of FIG. 1, the alpha letter "O" (labeled A) and the numeral "0" (labeled B) could clearly be distinguished in such a context.

While accuracy of OCR can be dramatically increased by using a form template, it will be clear that such an arrangement is not perfect. A primary problem is that over time, structured documents change. Even if the information requested remains the same (and it rarely does) the physical arrangement of data entry fields on a hard copy document is changed regularly for a variety of reasons. To use a template-based OCR system, the template must be updated each time that the structured document is changed. In some complex systems, a library of structured documents may be created, with an added structured document detection function that distinguishes between instances of structured documents. Such processing is problematic.

In U.S. patent application Ser. No. 07/814,552 (also published as WO 941957, Sep. 1, 1994) entitled "Software Product for Categorizing Strings in Character Recognition" by Kaplan, Shuchatowitz and Mullins (hereinafter, Kaplan et al.), filed Dec. 30, 1991, and assigned to the same assignee as the present application, it is proposed that recognition can be based on lexical class. Generally, a character recognition process operates on the basis of character strings, directing to a classifying processor a matrix of possible strings, accompanied by indicators of correctness. A classifying processor "compares" each possible string to preprogrammed class or grammar rules, to determine whether the string conforms to one or more sets of rules. One or more class identifiers are then attached to the data representing a possible character string, according to whether the string meets the rules. Commonly, this process will eliminate invalid strings. If no known set of rules is met, returned data will indicate such a failure. Lexical classification has many advantages, including increase in recognition accuracy in numbers and other non-word strings.

Also of interest are: U.S. Pat. No. 4,654,875 to Srihari, which describes a method of linguistic string analysis, based on likelihood of certain letters occurring serially. U.S. Pat. No. 5,159,667 to Borrey et al. recognizes global document features based on a comparison to known document types. U.S. Pat. No. 5,052,043 to Gaborski shows a neural net system of use in OCR systems. U.S. Pat. No. 4,750,122 to Kaji et al. shows segmentation of text into words on which a dictionary search may be made. U.S. Pat. No. 5,251,294 to Abelow teaches accessing available sources of information, extracting components, labeling the components and forming them into discrete units called contexts.

References disclosed herein are incorporated by reference for their teachings.

SUMMARY OF THE INVENTION

The present invention is directed to a method of processing structured documents for the derivation of information therefrom, with pattern recognition techniques recognizing patterns in the structured document images, using lexical class context to increase recognition accuracy.

In accordance with one aspect of the invention, patterns of intelligence detected in a digital image representation are correlated with pattern classes according to a predetermined set of rules for improved pattern information. Identified patterns are subsequently mapped to classes for continued use of classification.

In accordance with one aspect of the invention, there is provided a character recognition method including the steps of:

receiving a digital image representing a hard copy structured document;

isolating characters in text portions of the digital image;

for a given string of isolated characters, specifying for each character possible alternative identifications of each character;

for the given string, forming a matrix of possible character identifications based on the alternative character identifications;

comparing each string in the matrix generated to set of rules established for string classification to determine lexical class;

from the comparison step, generating a modified string, including characters confirmed by context processing specific to a determined lexical class;

from the comparison step, generating at least one lexical class identifier for association with the modified string.

In accordance with another aspect of the invention there is provided a character recognition method, as described, returning a modified string and lexical class identifier, and additionally returning a location identifier, whereby occurrence of a string with a lexical class identifier is uniquely identified for further processing.

The present invention takes advantage of the use of pattern classification for structured document processing with context driven pattern recognition. For pattern recognition, context clues are provided. Since the context clues are independent of structured document's physical layout, neither structured document templates or structured document identification is required. Structured documents calling for similar information, but having a variety of physical layouts, can be processed in a single batch.

In another embodiment of the invention, upon detection of a character string falling into a preselected class, the physical location of the detected string can be noted in order to provide further useful context. Knowing not only that information falls into a class, but the location of the occurrence on a page, provides additional useful context for indexing or routing documents, automatic identification of keyword and structured documents, etc.

A more complete understanding of the present invention can be obtained by considering the following detailed description in conjunction with the accompanying drawings in which.

Figure 3:
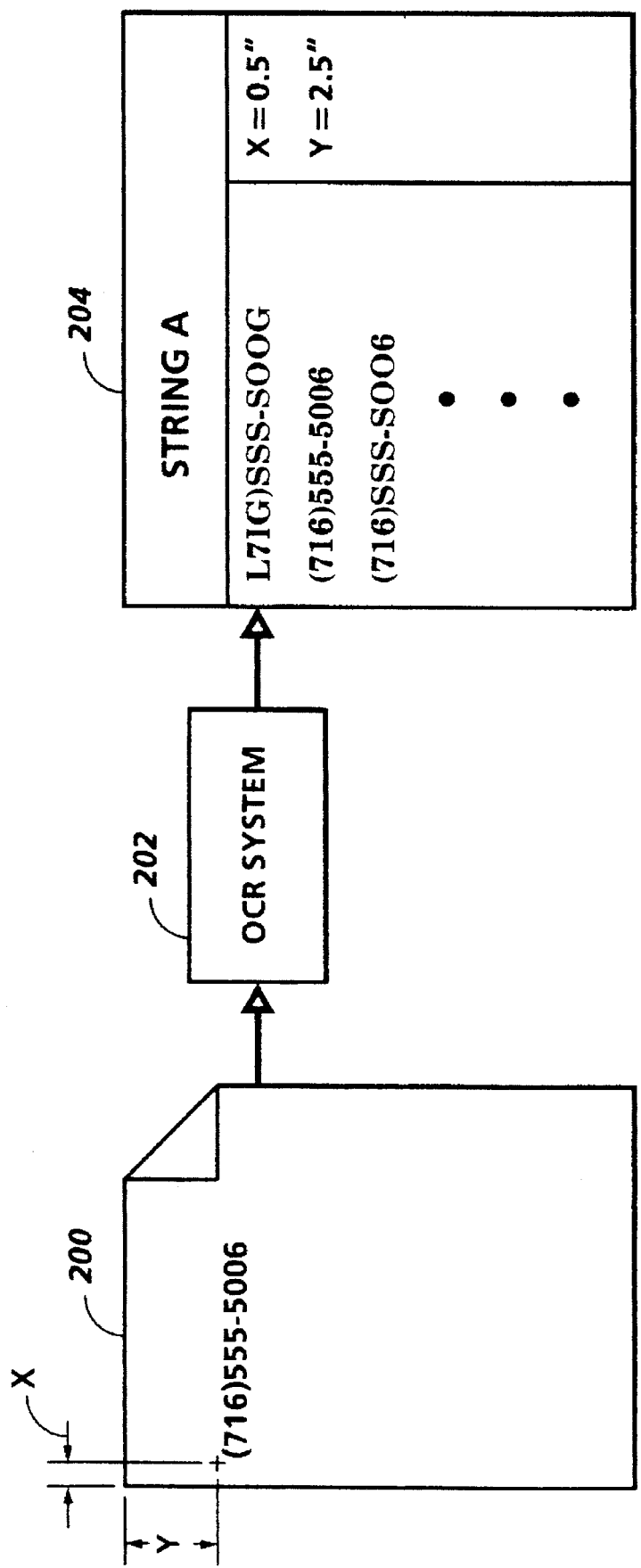
Figure 4:
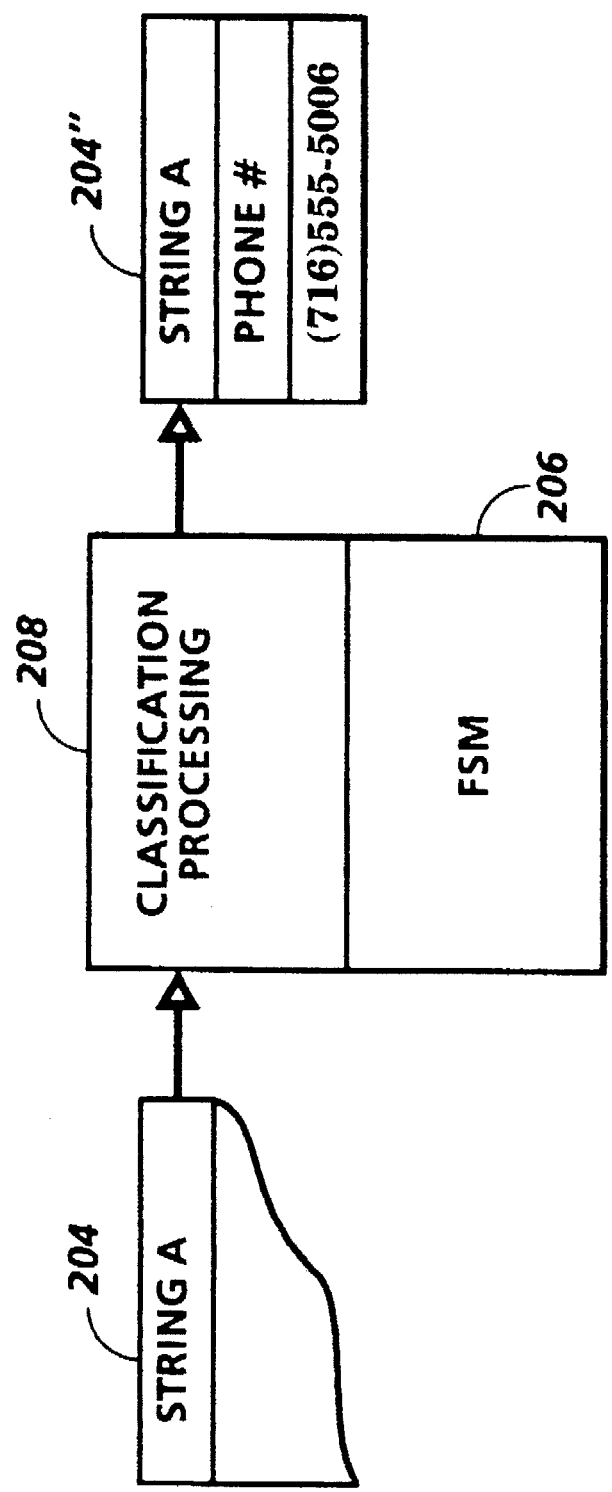
Figure 5:
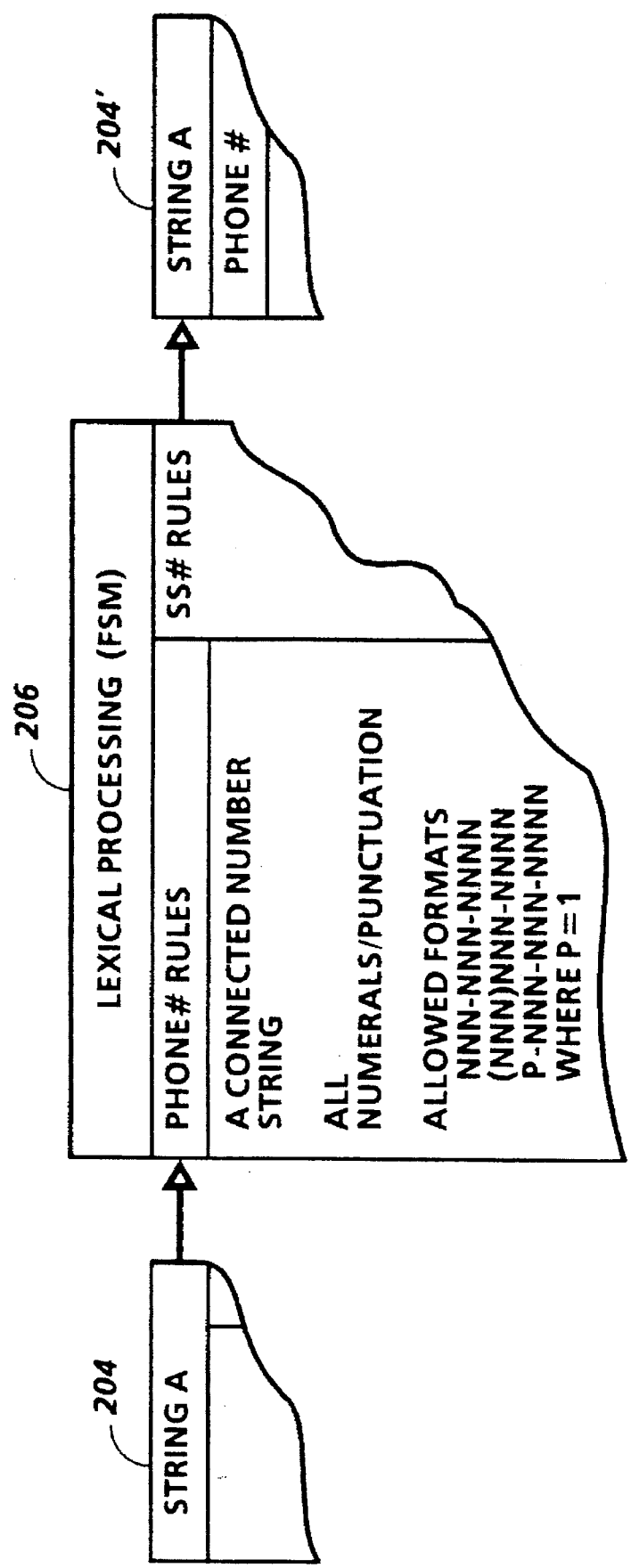
Figure 6:
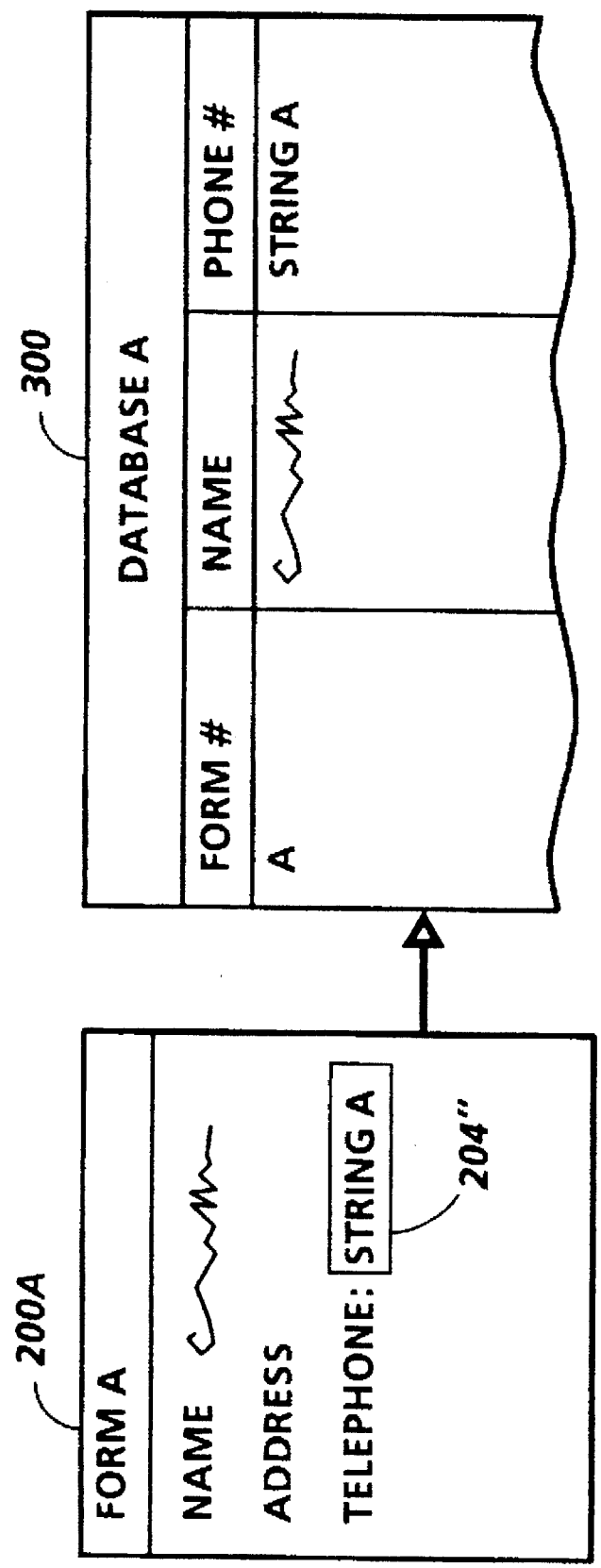

FIGS. 3, 4 and 5 together illustrate the principle of the invention;

FIG. 6 shows one embodiment in which the present invention finds use; and

Figure 7:
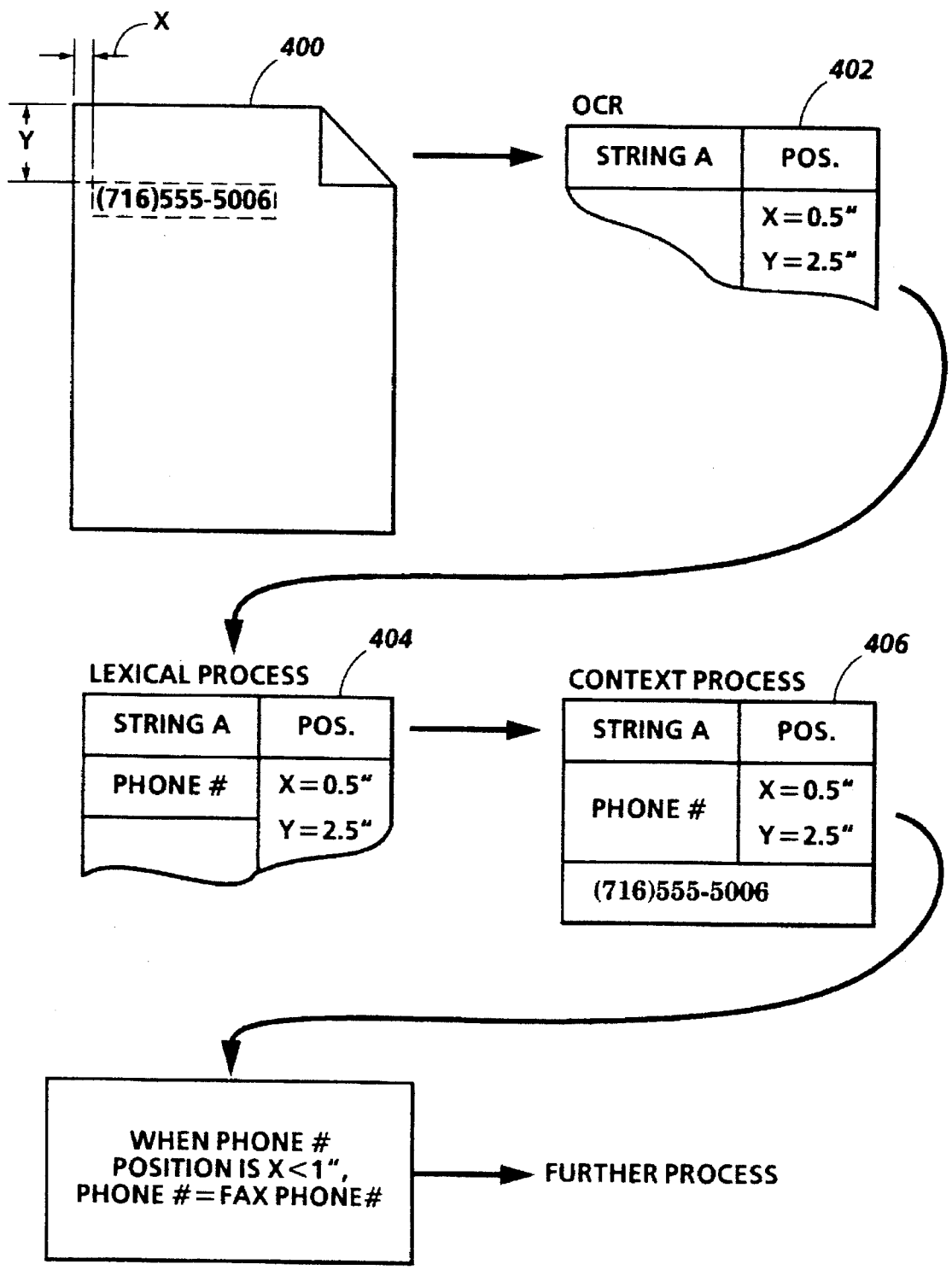

FIG. 7 shows another embodiment in which the present invention finds use.

DESCRIPTION OF THE PREFERRED EMBODIMENT

Figure 2:
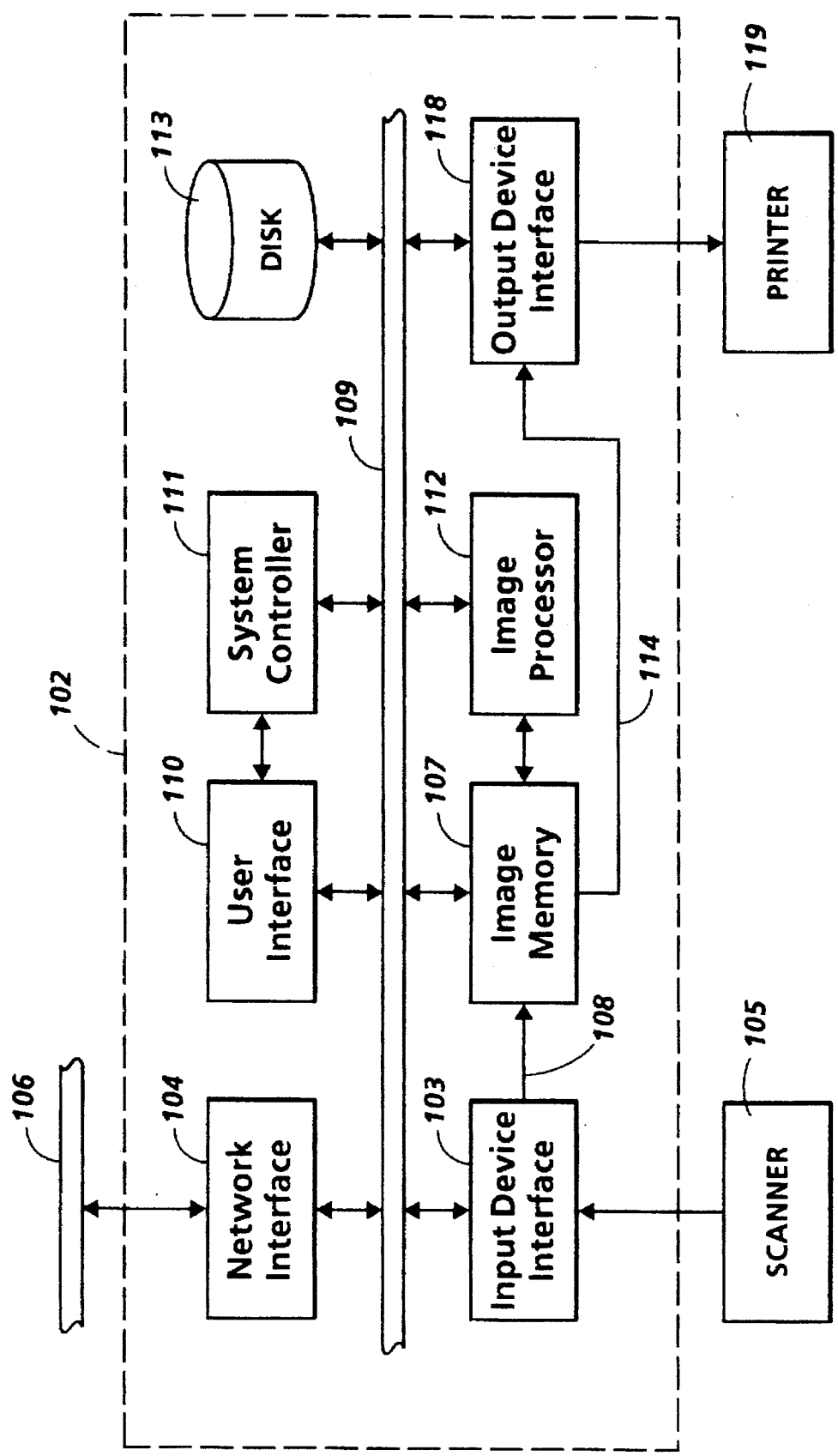
FIG. 2 represents an exemplary document processing system in which the present invention may find use.

With reference now to the drawings, where the showings are for the purpose of illustrating an embodiment of the invention and not for limiting same, at FIG. 2, a generalized system is illustrated in which the present invention may find use. A basic document processing system is shown including a document processing system 102. The image processing system 102 receives image information either through input device interface 103 or network interface 104 or a facsimile device (not shown). In this embodiment, input device interface 103 is connected to scanner 105 which generates images I(x,y,d) having a defined width x, length y and number of density levels d. Common scanners, such, for example, the Pixelcraft 7650, produce 8 bit/pixel data, providing d=256, at resolutions acceptable for many purposes. Scanners associated with facsimile devices may also be adequate. Alternatively, image information received through network interface 104 from network 106 can be transmitted from devices such as remote scanners, facsimile devices, file servers, etc. (not shown). Information received through network interface 104 may contain in part or in full image information in the structured document of raster images having a defined width, length and depth.

Once a raster image is received from scanner 105 by document processing system 102, image I(x,y,d) is transmitted to image memory 107 either through connection 108 or data bus 109 as directed by system controller 111. In the event image information is simultaneously received through interfaces 103 and 104, controller 111 routes image information from network 106 to secondary storage or hard disk 113 through data bus 109 and image information from input device or scanner 105 to primary storage or image memory 107 using connection 108. Once image information such as image I(x,y,d) is received and stored in memory 107, image processor 112 is invoked by controller 111 as programmed through user interface 110 which operates on a video display or the like. Subsequent to processing image I(x,y,d) by optical character recognition (OCR) the recognized text is routed for subsequent use in word processor applications, database applications, mail sorting/routing applications useful in association with a computer or workstation.

Figure 1:
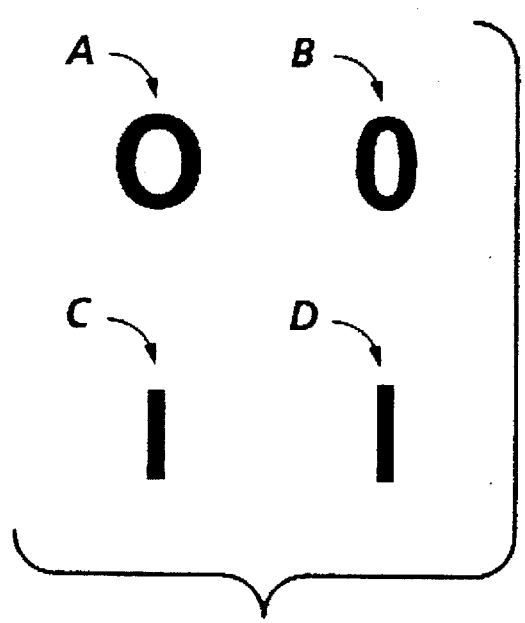
FIG. 1 illustrates the problem of ambiguous characters.

Turning now to FIG. 3, the principle of the invention is explained. Initially, a digital image 200, perhaps a binary bitmap, is generated, commonly by optically scanning a hardcopy document. A digital image file now provides a useful representation of the image, in a gray level or binary structured document. An OCR system 202 is used to derive initial guesses at the characters present. OCR systems are well known in the art, including commercial products from a variety of companies, including, for example, an OCR system from Xerox Imaging Systems, Inc., sold under the trademark "TEXTBRIDGE". Commonly (although not necessarily), such systems operate as software applications on industry standard hardware platforms (represented by document processing system 102 in FIG. 1), within operating systems such as MS-DOS™ or WINDOWS™ from Microsoft Corporation, or System 7™ from Apple Computers, Inc. Such OCR systems typically operate on the digital image, isolating characters, generating possible character identification for each character and identifying likely character strings. In the particular system proposed, an output will be a data file 204 of possible strings, each string representing a different guess at the characters making up the string. Thus, for example, one string will represent a word with one choice for an ambiguous character, while another string will represent a word with another choice for the same ambiguous character. Each string also has associated with it, the position on the page at which it was found in terms of page x-y coordinates.

In FIG. 4, the data file 204 of strings will be passed to the classification processor 208. The LEXIFIER™ classification software (a product of the Xerox Corporation) may conveniently be executed by classification processor 208, in accordance with U.S. patent application Ser. No. 07/814,552 (also published as WO 941957, Sep. 1, 1994) entitled "Software Product for Categorizing Strings in Character Recognition" by Kaplan, Shuchatowitz and Mullins (hereinafter, Kaplan et al.), filed Dec. 30, 1991. The product includes context processing, using context information for string recognition.

With reference to FIG. 5, in Kaplan et al., a system is described that efficiently operates on strings to compare them to preset patterns for lexical classes of strings. By a lexical class, we refer to strings identifiable by character patterns which have certain defined semantic or linguistic meanings. Patterns can be programmed for identification of strings of characters, as words, currency, dates, times, numbers and math symbols, roman numerals, social security numbers, address block elements, and the given example, North American Phone number, etc. Upon processing at lexical processor 206, the strings (now identified as 204') are returned with lexical class identifiers. In FIG. 5, a string may be returned with multiple possible class identifications, although the example shows only an identification of "Phone#", indicating that the string has a format commonly associated with a North America telephone number. This information is now returned to classification processor 208.

In order to preset patterns for lexical classes, a preparation of variations of class definitions is facilitated by providing a specialized user interface to the LEXIFIER™ classification software. The user can define a category of character strings either with the name of a file that includes a list of strings or with a definition in the form of a special grammar. The grammar can be used, for example, to define a category that has an infinite number of acceptable strings, such as the arabic numbers, arithmetic expressions, or currency amounts; to define a category in which the acceptable strings follow algorithmic rules, such as the roman numbers, phone numbers, or social security numbers; or to extend a category such as a list of strings by adding variations that include punctuation or hyphenation, that combine strings to form compound strings, or that include reasonable patterns of characters similar to those occurring in the strings in the list.

In a current implementation, a user can provide regular expressions that describe acceptable strings in various ways. For example, an expression can indicate that a string is acceptable if it includes, in sequence, a substring of beginning punctuation, an optional arabic numeral, a substring of separators, an acceptable string from a lexicon, another substring of separators, another acceptable string from the lexicon, and so forth, and ends with a substring of ending punctuation. Or, an expression can indicate that a string is acceptable if it includes, in sequence, a number from 1–9, a substring of from zero to two numbers from 0–9, and then either ends or continues with any number of substrings that include a comma followed by three numbers from 0–9.

The definition of each category is used to produce a respective finite state machine (FSM). Category data is included in each FSM indicating that each acceptable string of that FSM ends with a tagmark and category identifier. The category for a composite string as described above may be the category of one of its constituent parts, such as the last string.

With reference again to FIG. 4, knowing the nature of the string A, we will use the string class (Phone#), and the data file 204 of possible strings, to use classification processor 208 to accurately determine the characters forming the string. Now, there are three types of information available about a string: a) the characters forming the string; b) a string classifier; and c) a string location. Given the class information, specific context information may be used in the Lexifier™ classification software. In the example proposed, "phone #" classification brings to bear such context understanding as what digits are possible in each phone number, what area codes are possible, within an area code, what exchanges are known, or possibly, comparison of the phone number to a library of likely phone numbers (perhaps an employee phone list, used by an employer), to produce the string 204'. Because of this comparison to context factors, the sting will be more accurately recognized.

At this point a forms processor can be implemented because the string sequence now includes: a) the characters forming the string; b) a string class; and c) a string location. The forms processor has several functions. In one embodiment, and with reference to FIG. 6, the forms processor classes (the now processed form A 200, now designated 200A) information to seed a database sorting information by class. Simply, a data base 300, stored perhaps in memory 113 is set up by class. Each entry string is sortable by class, with the class identifier attached. Accordingly, for each record (in this case, each form) the string associated with the class identifier is stored in the class field.

With reference now to FIG. 7, in another embodiment, the system uses location information to further classify certain classified strings. For example, from a form 400, after OCR and Lexical processing at (steps 402 and 404, respectively) knowing that a string is a Phone#, and knowing that the phone numbers of the sender commonly appear in facsimile transmitted documents, the system can at step 406 identify certain Phone#'s as facsimile origination numbers, and in a document management system, forward a response to the facsimile number (perhaps as simple as an acknowledgement of receipt) or route the facsimile to its intended recipient, based on the sender's phone number.

In yet another embodiment, structured documents information is used for its knowledge content to take action with the structured document. In one possible example, with knowledge of a phone number format, the structured document can be renamed with the originating facsimile number.

This discussion has concentrated on showing one possible example of a lexical class, including a phone number; however, as it has been pointed out, almost any class of objects which provide some commonality for pattern detection may be classed together. Conceivably, it would be possible to recognize certain patterns in pictures, perhaps faces of people, and treat those faces differently than the remainder of the document. With a graphical object identified as a face, action could be taken to move the object to a database of faces, either alone or in association with other graphical or linguistic information.

The disclosed method may be readily implemented in software using standard software development environments that provide portable source codes that can be used on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A character recognition method including the steps of:

receiving a digital image representing a hard copy structured document;

isolating characters in text portions of the digital image;

for a given string of isolated characters, specifying for each character possible alternative identifications of each character;

for the given string, forming a matrix of possible character identifications based on the specified alternative character identifications;

comparing each string in the matrix to a set of rules established for string classification to determine a lexical class for each string, wherein the lexical class establishes the rules to identify character patterns within each string based upon predefined meanings;

from the comparison step, generating a modified string, including characters confirmed by context processing specific to a determined lexical class;

from the comparison step, generating at least one lexical class identifier for association with the modified string.

2. The method as described in claim 1, where said digital image is received from a light intensity scanning device, which is operative to scan a hard copy document, to derive density-representing digital signals from sensed reflected light.

3. The method as described in claim 1, wherein the step of isolating characters in text portions of the digital image additionally identifies a relative location of the string in said hard copy structured document whereby occurrence of a string with a lexical class identifier is uniquely identified for further processing.

4. The method as described in claim 1, wherein the lexical class comprises a class selected from a set of pattern classes including:

Arabic numbers;

arithmetic expressions;

currency amounts;

Roman numbers;

phone numbers;

Social Security numbers;

strings that include punctuation; and compound strings.

* * * * *